(12) United States Patent
Staudenmaier et al.

(10) Patent No.: US 9,641,918 B2
(45) Date of Patent: May 2, 2017

(54) AUDIO UNIT AND METHOD FOR GENERATING A SAFETY CRITICAL AUDIO SIGNAL

(75) Inventors: Michael Staudenmaier, Munich (DE); Vincent Aubineau, Gif sur Yvette (FR); Davor Bogavac, Kallered (SE)

(73) Assignee: NXP USA, Inc., Austin, TX (US)

( * ) Notice: Subject to any disclaimer, the term of this patent is extended or adjusted under 35 U.S.C. 154(b) by 137 days.

(21) Appl. No.: 14/423,478

(22) PCT Filed: Aug. 24, 2012

(86) PCT No.: PCT/IB2012/001815
§ 371 (c)(1),
(2), (4) Date: Feb. 24, 2015

(87) PCT Pub. No.: WO2014/030027
PCT Pub. Date: Feb. 27, 2014

(65) Prior Publication Data
US 2015/0245116 A1  Aug. 27, 2015

(51) Int. Cl.
*H04R 29/00* (2006.01)
*H04R 1/00* (2006.01)
(Continued)

(52) U.S. Cl.
CPC ............ *H04R 1/00* (2013.01); *B60Q 9/00* (2013.01); *G08B 1/08* (2013.01); *G08B 3/00* (2013.01);
(Continued)

(58) Field of Classification Search
CPC ........ H04R 5/04; H04R 29/00; H04R 29/001; H04R 29/007; G08B 1/08; G08B 3/00; G08B 3/10; G08B 29/126; A61B 5/14552; A61B 5/746

USPC ............... 381/56, 58, 59, 60, 82, 111, 150; 340/384.1, 506, 507, 511, 514, 573.1; 600/300, 301

See application file for complete search history.

(56) References Cited

U.S. PATENT DOCUMENTS 5,652,566 A * 7/1997 Lambert ............... G08B 29/10
340/506
6,822,564 B2 * 11/2004 Al-Ali ..................... A61B 5/746
340/511
(Continued)

FOREIGN PATENT DOCUMENTS

DE  10036573 A1  3/2002

OTHER PUBLICATIONS

International Search Report and Written Opinion correlating to PCT/IB2012/001815 dated Jun. 10, 2013.

*Primary Examiner* — Huyen D Le

(57) ABSTRACT

An audio unit, connected or connectable to a safety-critical apparatus, or integrated or integrable in the apparatus, is proposed. The audio unit may comprise a driver unit, a detection unit, and an alert unit. The driver unit may generate an analog audio signal in response to a request from the apparatus, to drive an acoustic output unit and thereby generate an acoustic signal for a user of the apparatus. The detection unit may detect the audio signal. The alert unit may generate an alert signal in response to the request if the detection unit has not detected the audio signal. It can thus be checked whether the acoustic signal is generated. A method for generating a safety critical acoustic signal is also described.

20 Claims, 4 Drawing Sheets

(51) Int. Cl.
*H04R 5/04* (2006.01)
*G08B 1/08* (2006.01)
*G08B 3/10* (2006.01)
*G08B 29/12* (2006.01)
*B60Q 9/00* (2006.01)
*G08B 3/00* (2006.01)

(52) U.S. Cl.
CPC ............ *G08B 3/10* (2013.01); *G08B 29/126* (2013.01); *H04R 5/04* (2013.01); *H04R 29/001* (2013.01); *H04R 29/007* (2013.01); *H04R 2225/41* (2013.01)

(56) References Cited

U.S. PATENT DOCUMENTS

| | | |
|---|---|---|
| 7,035,700 B2 | 4/2006 | Gopalan et al. |
| 2005/0242942 A1 | 11/2005 | Staats et al. |
| 2006/0017560 A1 | 1/2006 | Albert |
| 2007/0109115 A1 | 5/2007 | Kiani et al. |

\* cited by examiner

AUDIO UNIT AND METHOD FOR GENERATING A SAFETY CRITICAL AUDIO SIGNAL

FIELD OF THE INVENTION

This invention relates to an audio unit and a method for generating a safety critical audio signal.

BACKGROUND OF THE INVENTION

Acoustic signals, for example, beep sounds or voice, may be particularly useful for safety critical applications such as operation of a motor vehicle, e.g., a motor car. An acoustic signal, e.g., an audible signal, may be advantageous compared to, e.g., an optical signal in that the acoustic signal may be more likely to be perceived by the user, e.g., by the operator of a machine such as the driver of a motor vehicle or a person working in a control room of, e.g., a factory, power plant, port, airport, or train station. While an optical signal may be perceived only when the signal is within the field of view of the user, the perception of an audio signal may be substantially independent of the current field of view of the user.

SUMMARY OF THE INVENTION

The present invention provides an audio unit and a method for generating a safety critical audio signal as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Figure 1:
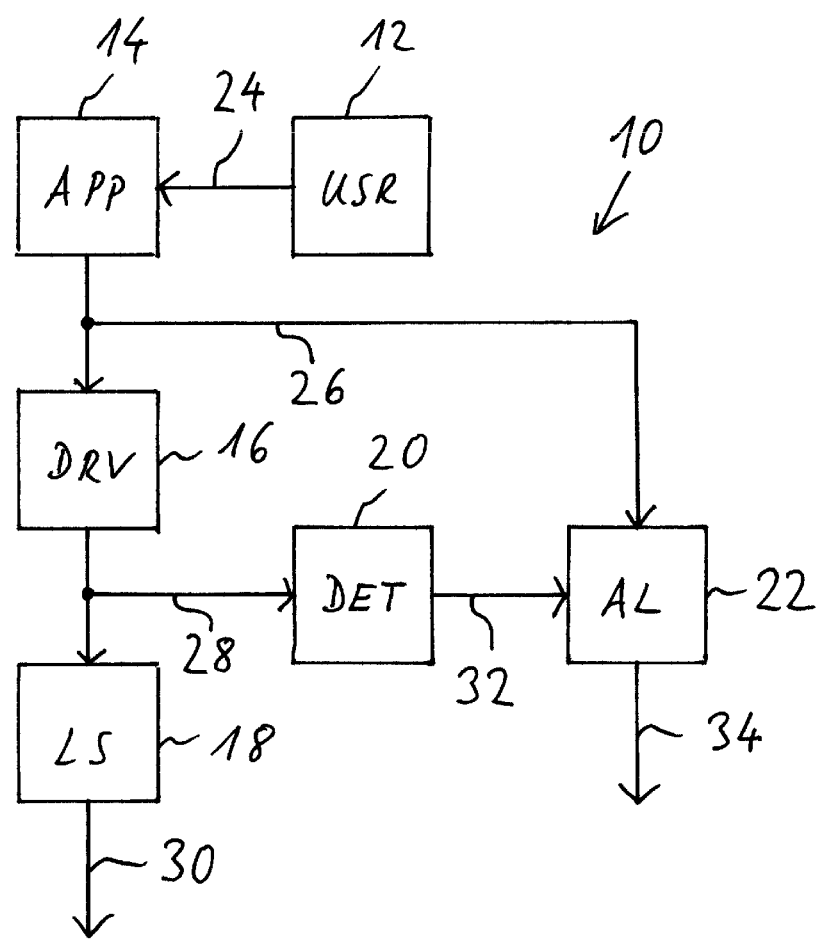
FIG. 1 schematically shows an example of an embodiment of an audio unit connected between an apparatus and a loudspeaker.

FIG. 1 schematically shows an example of an audio unit 10. The audio unit may comprise, for example, a driver unit 16, a detection unit 20, and an alert unit 22. In the shown example, the audio unit 10 is connected between an apparatus 14 and an acoustic output device, e.g., a loudspeaker 18. The apparatus 14 may be controllable by a user 12. Although in the present example the audio unit 10 and the apparatus 14 are shown as separate units, the audio unit 10 may be integrated or arranged within the apparatus 14. For instance, the apparatus 14 may be a motor vehicle, such as a motor car, a ship, or an aircraft. In another example, the apparatus 14 may be a subsystem of a motor vehicle. In yet another example, the apparatus 14 may be an electronic control system of a manufacturing plant. In the shown example, the driver unit 16 may be connected between the apparatus 14 and the loudspeaker 18. The detection unit 20 may be connected to the driver unit 16. The alert unit 22 may be connected to the detection unit 20. The alert unit 22 may furthermore be connected to the apparatus 14.

The apparatus 14 may have a user input such as a mechanical or electric control element, or several control elements for enabling the user 12 to control the apparatus 14. A control action performed by the user 12 is represented by the arrow 24.

The apparatus 14 may be arranged to output a request 26 for an acoustic signal. For instance, the apparatus 14 may generate a request 26 for an acoustic warning signal in response to an operating parameter of the apparatus 14, e.g., a temperature, pressure, or speed being outside an allowed range or outside an optimal range. In another example, an operating state of the apparatus 14 may change, for instance, in response to the user input 24, and the apparatus 14 may then generate a request for an acoustic information signal for informing the user 12 that the operating state has changed. For instance, in a scenario in which the apparatus 14 is a motor car and the user 12 is a driver of the motor car 14, the driver 12 may actuate, for instance, a turn signal lamp of the motor car 14 in order to signal an intended change of driving direction, for example at a junction. The turn signal lamp may also be known as a directional indicator, directional signal, blinker, or flasher. A turn signal lamp may, for example, be mounted at each of the four corners of a motor car, respectively. The blinker may be actuated, for instance, by means of a lever arranged next to a steering wheel of the motor car 14. In this example, the request 26 may be a request for a ticking sound which is to be maintained as long as the blinker is activated. The driver 12 may hear the ticker sound and thus know that the blinker is active and thus be reminded to turn it off when the turning maneuver has been completed. Certain acoustic signals may be prescribed by law. For instance, in many countries, motor cars are required to generate a ticking sound when a blinker is active.

The driver unit 16 may react to the request 26 by generating an audio signal 28 to drive the loudspeaker 18 so as to generate the requested acoustic signal 30. The audio signal 28 may, for example, be an analog audio signal such as an electrical voltage or an electrical current with an amplitude corresponding to an amplitude of the acoustic signal 30. For example, the loudspeaker 18 may comprise a coil connected to a membrane. By applying the audio signal 28, which in this example may be an electrical voltage, across the coil, the membrane (not shown) may be driven to oscillate in accordance with the analog audio signal 28 and thereby generate sound, namely, the acoustic signal 30, which may be heard by the user 12.

The detection unit 20 may be arranged to detect the audio signal 28. For instance, the detection unit 20 may comprise a sensor connected to the driver unit 16 for sensing the audio signal 28. In the example in which the audio signal 28 is an electrical voltage, the sensor may, for instance, be a voltage sensor. The voltage sensor may, for instance, be connected to an audio line, e.g., a simple or dual conductor via a branch off. The branch off point, i.e., the point at which the branch off may be mechanically and thus conductively connected to the output of the driver unit 16 may notably be chosen at the output of the driver unit 16 itself or, alternatively, at the input of the loudspeaker 18. Arranging the branch off point of the audio branch off at the output of the driver unit 16 may be beneficial for a design in which the loudspeaker 18 is not integrated in the audio unit 16, 20, 22. On the other hand, arranging the audio branch off point at the input of the loudspeaker 18, e.g., by a first conductor line attached to a first end of the loudspeaker coil and a second conductor line attached to a second end of the loudspeaker coil, may be beneficial for verifying that the audio signal 28 is not only output by the driver unit 16 but also received at the loudspeaker 18. A fault in the audio signal feed from the driver unit 16 to the loudspeaker 18 may thus be detected.

The detection unit 20 may be arranged to output a detection signal 32 for indicating whether or not it has detected the audio signal 28. The detection signal 32 may be fed to the alert unit 22. The alert unit 22 may be arranged to generate an alert signal 34 in response to the request 26 if the detection unit 20 has not detected the audio signal 28. For instance, the alert unit 22 may be arranged to generate the alert signal 34 if it does not receive the detection signal 32 within a certain period after receiving the request 26. The alert signal 34 may, for example, be a signal that can be perceived by the user 12 if the user 12 is present. The alert signal 34 may, for example, be an optical, tactile or acoustic signal. For instance, the alert signal 34 may be generated by a light source such as a light emitting diode. If, for instance, the apparatus 14 is a motor car, the light source may be arranged within, for instance, a control panel. The control panel may, for example, be the familiar instrument panel behind the steering wheel. The alert signal 34 may, however, be generated differently. For instance, the alert signal 34 may be provided by an indication displayed on a digital display such as, e.g., a computer screen or an LCD panel. In another example, the alert signal 34 may be fed to the apparatus 14. A tactile alert signal 34 may for instance be generated by means of a vibration unit or other kind of movable device. A unit for generating a tactile alert signal 34 may, for instance, be integrated in a seat for the user or at some other position in close proximity to the user. While an acoustic alert signal 34 may be advantageous in that it may be readily perceived by e.g. the user 12 or by another person, a non-acoustic alert signal 34 may be advantageous in that it may be more readily recognized by the user 12 or by another person as unusual and thus, perhaps, as particularly important.

The apparatus 14 may thus be enabled to react to the alert signal 34, for instance, by changing its operating state. The apparatus 14 may notably be arranged to switch off one or more components in response to the alert signal 34. The apparatus 14 may also be arranged to generate a warning signal (not shown) for the user 12. In yet another example, the alert unit 22 may be arranged to generate, in addition to the alert signal 34 as described above, a second alert signal (not shown). The first alert signal 34 and the second alert signal (not shown) may, for example, be generated for the user 12 and for the apparatus 14, respectively. In another example, the volume of the acoustic signal 30 may be increased if the detection unit 20 fails to detect the audio signal 30 in response to the request 26. To this end, the alert signal 34 may be fed to, e.g., the driver unit 16. The alert signal allows to check whether the audio signal is generated, and this can make the apparatus safer to operate.

Figure 2:
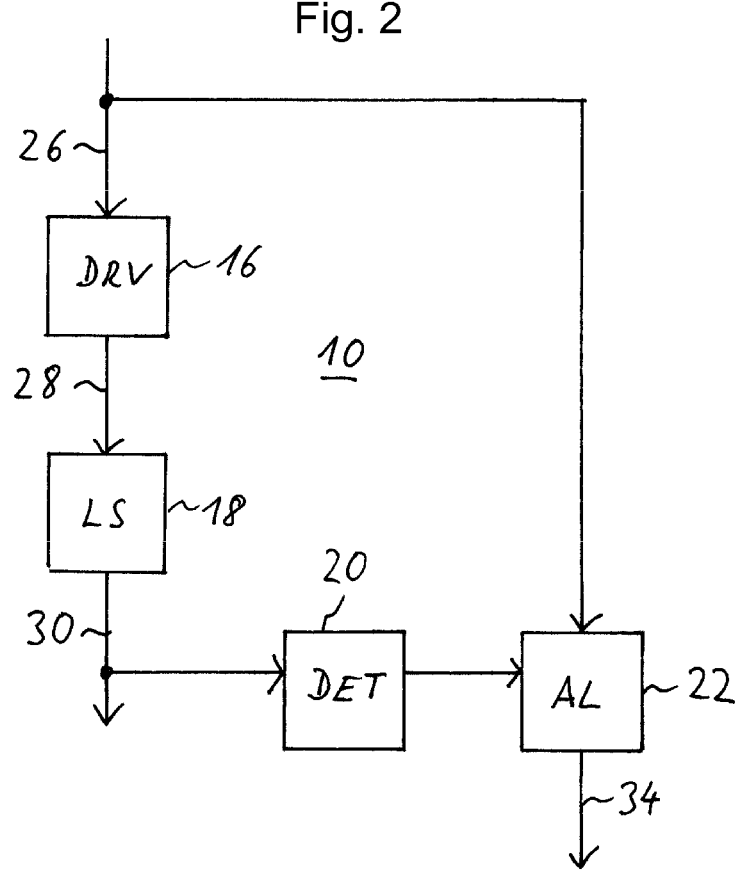
FIG. 2 schematically shows another example of an embodiment of an audio unit connected between an apparatus and a loudspeaker.

An example of a variant of the audio unit 10 is schematically shown in FIG. 2. In this example, the detection unit 20 is coupled to an output of the loudspeaker 18. The detection unit 20 may thus detect the audio signal 28 from the acoustic signal 30, e.g., by means of a microphone. The loudspeaker 18 may thus be considered part of the detection unit 20, although the loudspeaker 18 and the detection unit 20 may be physically distinct and separate devices.

Figure 3:
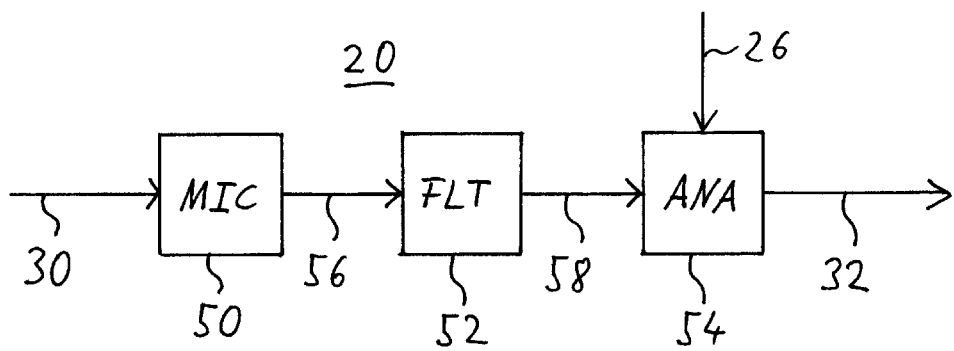
FIG. 3 schematically shows an example of an embodiment of a detection unit.

An example of the detection unit 20 shown in FIG. 2 is further described in reference to FIG. 3. The detection unit 20 may comprise, for instance, a sound sensor 50 (sound detector), e.g., a microphone, and an analysis unit 54. The sound sensor 50 may be arranged to receive the acoustic signal 30 from the loudspeaker 18 via a suitable medium. The medium may be gaseous. For instance, the medium may be air, for instance, reverting to the example of a motor vehicle 14, the air within a cabin of the vehicle. Alternatively or additionally, the sound sensor 50 may be connected to the loudspeaker 18 by a sound conductor, which may be rigid. The sound sensor 50 may be arranged to output a sound detection signal, e.g., an electrical signal 56 corresponding to the received acoustic signal 30. The electrical signal 56 may be fed to the analysis unit 54. In the shown example, a filter 52 may be connected between the sound sensor 50 and the analysis unit 54. The electrical signal 56 may thus be filtered by the filter 52 and further transmitted as a filtered signal 58 to the analysis unit 54. The filter 52 may be arranged, for instance, to transmit only a selected part of e.g. a spectrum of the electrical signal 56. The part that is transmitted by the filter 52 may be chosen such that the analysis unit 54 is enabled to determine whether the acoustic signal 30 corresponding to the request 26 is contained in the sound captured by the sound sensor 50. The analysis unit 54 may be arranged to generate the alert signal 32 when it has received the request 26 but has not received a corresponding filtered signal 58.

The example described in reference to FIGS. 2 and 3 may be beneficial in that an error related to the loudspeaker 18 may be detected. For instance, in a scenario in which the driver unit 16 correctly generated the audio signal 28 and the loudspeaker 18 fails to generate the acoustic signal 30, the alert unit 22 may generate an alert signal 34. In contrast, the alert unit 22 arranged as shown in FIG. 1 would not necessarily generate an alert signal 34 because it is not necessarily responsive to the sound generated by the loudspeaker 18.

It may be beneficial to generate the audio signal 28 such that it comprises user audio destined for the user 12 and detection audio destined for the detection unit 20, for example. Adding detection audio to the user audio may also be referred to as acoustic marking. The detection unit 20 may thus be arranged to detect the audio signal 28 by detecting the detection audio. The detection audio may, for instance, comprise a sound pattern that may be detectable in a particularly reliable manner. For instance, considering again the example of a ticking sound for indicating that a vehicle directional indicator is active, the user audio (user component) may be the tick-tock sound and the detection audio (detection component) may be another sound that can be easier to detect by the detection unit 20. The detection component may, for instance, comprise higher frequencies than the user component. The detection audio may be inaudible for a person who hears normally. For instance, the detection audio may be masked psychoacoustically by the user audio. Psychoacoustic effects have been intensely studied and are exploited, for instance, in audio compression methods such as MP3 and Vorbis. The detection audio may notably be designed to make it easier to detect in a noisy environment.

Figure 4:
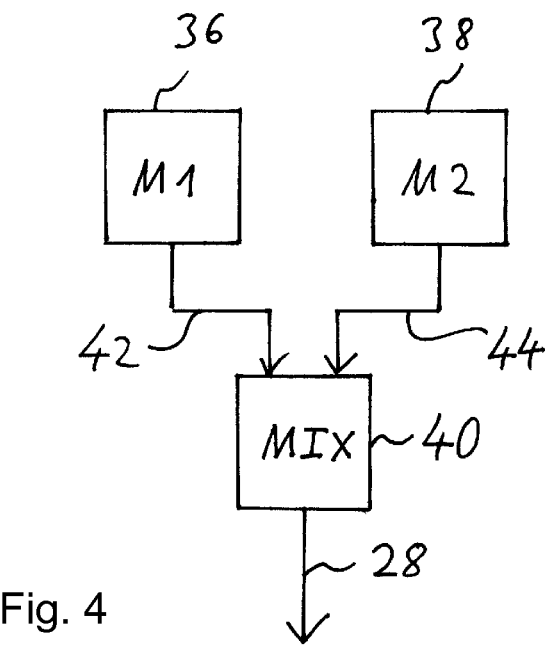
FIG. 4 schematically shows an example of an embodiment of a driver unit.

Referring now to FIG. 4, an audio signal 28 comprising user audio and detection audio may, for instance, be generated by blending the user audio 42 with the detection audio 44. In the example, the user audio 42 and the detection audio 44 may be blended on the fly, i.e., in real time in the process of outputting the audio signal 28. In the shown example, the audio unit 10 may comprise a first memory unit 36 and a second memory unit 38. The first memory unit 36 may contain first audio data representing the user audio. The second memory unit 38 may contain second audio data representing the detection audio. The audio unit 10 may further comprise a mixer unit 40 for blending the user audio with the detection to generate the audio signal 28. The first audio data and the second audio data or both may, for instance, be stored in the respective memory unit 36, 38 in a compressed format such as MP3 or Vorbis, for example. The first memory unit 36 and the second memory unit 38 may be located within the same data storage device. Alternatively, they may be located in separate devices. For instance, the second memory unit 38 containing the detection audio data may be located in the driver unit 16, and the first memory unit 36 may be located in a multimedia storage unit of the apparatus 14. Blending the user audio with the detection audio may be beneficial for saving memory space if various kinds of user audio are to be blended with one or more than one kind of detection audio.

Figure 5:
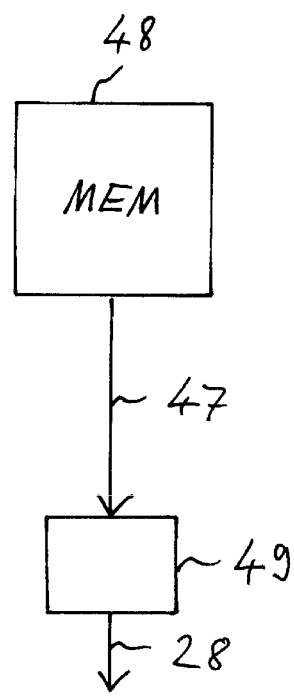
FIG. 5 schematically shows another example of an embodiment of a driver unit.

FIG. 5 schematically illustrates a design that may provide an alternative to the one shown in FIG. 4. In the present example, the audio unit 10 may comprise a memory unit 48 containing audio data representing a blend of the user audio and the detection audio. The audio unit 10 may further comprise a player unit 49 for generating the audio signal 28. The player unit 49 may thus generate the audio signal 28 without blending the user audio with the detection audio. For instance, the player unit 49 may be arranged to read a data stream 47, e.g., an MP3 or Vorbis stream, from the memory unit 48, decode it, and generate the analog audio signal 28. Compared to the example described in reference to FIG. 4, the present design (FIG. 5) may be simpler but may require a larger memory unit 48 because various combinations of different kinds of user audio blended with one kind or with different kinds of detection audio may have to be stored. The player unit 49 may, for instance, be located in the driver unit 16 (cf. FIGS. 1 and 2). The memory unit 48 may, for instance, be located in the driver unit 16 too or in, e.g., the apparatus 14.

Figure 6:
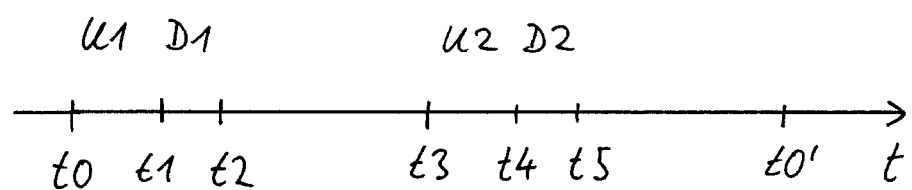
FIG. 6 schematically illustrates an example of an audio signal.

FIG. 6 schematically illustrates an example of the audio signal 28 or equivalently, the acoustic signal 30. In this example, the audio signal 30 may be a blend of user audio U1, U2 and detection audio D1, D2. For instance, the audio signal 28 may consist of, in this order: user audio U1 from, e.g., time T0 to time T1, first detection audio D1 from, e.g., T1 to T2, silence from, e.g., T2 to T3, second user audio from, e.g., T3 to T4, second detection audio D3 from, e.g., T4 to T5, and silence from, e.g., T5 to T0'. At time T0', the sequence may be repeated, i.e., a new cycle comprising U1-D1-silence-U2-D2-silence may follow (not shown). For instance, user audio U1 may represent a tick sound, and user audio U2 may represent a tock sound. A sequence U1-U2 may thus represent a tick-tock sound. Alternatively, U1 and U2 may be identical. Similarly, detection audio D1 and detection audio D2 may be identical or different. In this example, the detection audio D1 may be generated immediately after the user audio U1. Similarly, the second detection audio D2 may be generated immediately after the user audio U2. Furthermore, the detection audio D1 may be sufficiently short for it to be masked psychoacoustically by the preceding user audio U1. The second detection audio D2 may be masked similarly by the second user audio U2. The detection audio, e.g., D1 and D2, may thus be inaudible for a person who hears normally. It is noted that the detection audio may be audible, however, for a person who does not hear the user audio, e.g., U1 and U2, due to, e.g., a hearing handicap. It may be beneficial to design the detection audio such that it has a frequency spectrum that is generally higher than the spectrum of the user audio, as it may be more likely that the user will be able to hear frequencies up to a maximum frequency but not above it. The user audio and the detection audio may, for instance, be superposed. The user audio and the detection audio may thus be played back at the same time.

Figure 7:
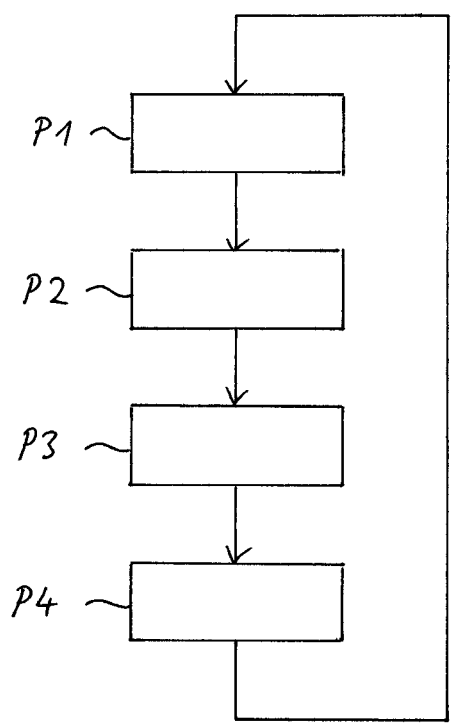
FIG. 7 shows a flow chart of an example of an embodiment of a method of generating an audio signal.

An example of a method for generating the acoustic signal 30 is illustrated by means of the flow chart in FIG. 7. The method may comprise: receiving an audio request 26 from the apparatus 14 (block P1), generating the analog audio signal 28 in response to the audio request 26, thereby driving the loudspeaker 18 to generate the acoustic signal 30 for a user 12 of the apparatus 14 (block P2), detecting the audio signal 28 (block P3); and generating the alert signal 34 in response to the audio request 26 if the audio signal 28 is not detected (block P4).

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on transitory or non-transitory computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, units 16, 18, 20, and 22 may be merged with the apparatus 14.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the driver unit 16, the detection unit 20, and the alert unit 22 may be implemented as a single processor. Alternatively, the examples may be implemented as any number of separate integrated circuits or separate devices interconnected with each other in a suitable manner. For example, the driver unit 16 may share a processor with the apparatus 14. The detection unit 20 may share a processor with the alert unit 22.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An audio unit, connected or connectable to a safety-critical apparatus, or integrated or integrable in said safety-critical apparatus, said audio unit comprising:
   a driver unit, connected or connectable to an acoustic output unit, and arranged to generate an analog audio signal in response to a request from said apparatus, drive said acoustic output unit, and
generate an acoustic signal for a user of said apparatus;
a detection unit, wherein said detection unit is arranged to detect said audio signal; and
an alert unit, connected to said detection unit, and arranged to generate an alert signal in response to said request if said detection unit has not detected said audio signal, wherein said audio signal comprises user audio for said user and detection audio for the detection unit;
a first memory unit containing first audio data representing said user audio;
a second memory unit containing second audio data representing said detection audio; and
a mixer unit for blending said user audio with said detection audio in order to generate said audio signal.

2. The audio unit of claim 1, wherein
said audio signal comprises user audio for said user and detection audio for the detection unit, and
said detection unit is arranged to detect said audio signal by detecting said detection audio.

3. The audio unit of claim 2, wherein said detection audio is inaudible for a person who hears normally.

4. The audio unit of claim 2, wherein said detection audio is masked psychoacoustically by said user audio.

5. The audio unit of claim 1, wherein said detection unit comprises:
a sound detector for generating a sound detection signal on the basis of sound; and
an audio analysis unit connected to said sound detector and arranged to detect said audio signal in said sound detection signal.

6. The audio unit of claim 5, wherein said audio analysis unit is arranged to detect detection audio in said sound detection signal.

7. The audio unit of claim 1, wherein said detection unit comprises a filter for transmitting a selected part of said audio signal.

8. The audio unit of claim 1, arranged to increase a volume of said acoustic signal if said detection unit fails to detect said audio signal in response to said request.

9. The audio unit of claim 1, wherein said alert signal is acoustic.

10. The audio unit of claim 1, wherein said alert signal is non-acoustic or comprises a non-acoustic component.

11. The audio unit of claim 1, wherein said apparatus is a motor vehicle, a construction machine, a production machine, a power plant control room, an air-traffic control room, a railway control room, a port control room, a medical therapy apparatus, a medical diagnosis apparatus, or a training apparatus for simulating one or more of these apparatuses.

12. The audio unit of claim 1, wherein said acoustic output unit is integrated in an ear speaker.

13. An audio unit, connected or connectable to a safety-critical apparatus, or integrated or integrable in said safety-critical apparatus, said audio unit comprising:
a driver unit, connected or connectable to an acoustic output unit, and arranged to generate an analog audio signal in response to a request from said apparatus, drive said acoustic output unit, and
generate an acoustic signal for a user of said apparatus;
a detection unit, wherein said detection unit is arranged to detect said audio signal; and
an alert unit, connected to said detection unit, and arranged to generate an alert signal in response to said request if said detection unit has not detected said audio signal, wherein said audio signal comprises user audio for said user and detection audio for the detection unit, and
wherein said driver unit comprises:
a memory containing audio data representing a blend of said user audio and said detection audio; and
a player unit for generating said audio signal from said audio data without blending said user audio with said detection audio.

14. The audio unit of claim 13, wherein said detection unit comprises:
a sound detector for generating a sound detection signal on the basis of sound; and
an audio analysis unit connected to said sound detector and arranged to detect said audio signal in said sound detection signal.

15. The audio unit of claim 13, wherein said detection unit comprises a filter for transmitting a selected part of said audio signal.

16. The audio unit of claim 13, arranged to increase a volume of said acoustic signal if said detection unit fails to detect said audio signal in response to said request.

17. The audio unit of claim 13, wherein said alert signal is acoustic.

18. The audio unit of claim 13, wherein said alert signal is non-acoustic or comprises a non-acoustic component.

19. The audio unit of claim 13, wherein said apparatus is a motor vehicle, a construction machine, a production machine, a power plant control room, an air-traffic control room, a railway control room, a port control room, a medical therapy apparatus, a medical diagnosis apparatus, or a training apparatus for simulating one or more of these apparatuses.

20. A method for generating a safety-critical acoustic signal for a user of an apparatus, comprising:
receiving an audio request from said apparatus;
generating an analog audio signal in response to said audio request, thereby driving an acoustic output unit to generate said acoustic signal, wherein said audio signal comprises user audio for said user and detection audio for the detection unit;
detecting said audio signal;
generating an alert signal in response to said audio request if said audio signal is not detected,
storing first audio data representing said user audio;
storing second audio data representing said detection audio; and
blending said user audio with said detection audio in order to generate said audio signal.

* * * * *